United States Patent [19]
Werner

[11] Patent Number: 5,971,523
[45] Date of Patent: Oct. 26, 1999

[54] LIQUID INK PRINTER HAVING MULTIPLE PROCESSORS FOR FAST COLOR IMAGING

[75] Inventor: John E. Werner, Rochester, N.Y.

[73] Assignee: Xerox Corporation, Stamford, Conn.

[21] Appl. No.: 08/883,520

[22] Filed: Jun. 26, 1997

[51] Int. Cl.$^6$ .................................................. B41J 2/21
[52] U.S. Cl. ............................................................ 347/43
[58] Field of Search ................................ 347/43, 42, 115, 347/172

[56] References Cited

U.S. PATENT DOCUMENTS

| | | | |
|---|---|---|---|
| 4,567,570 | 1/1986 | Peer ........................................... | 364/900 |
| 4,855,753 | 8/1989 | Ichikawa et al ........................... | 347/43 |
| 4,908,712 | 3/1990 | Uchiyama et al. ......................... | 347/43 |
| 5,016,190 | 5/1991 | Thomson .................................. | 364/518 |
| 5,091,734 | 2/1992 | Suzuki et al. .............................. | 347/43 |
| 5,579,453 | 11/1996 | Lindenfelser et al. ................... | 395/115 |
| 5,608,549 | 3/1997 | Usami ........................................ | 347/43 |
| 5,619,622 | 4/1997 | Audi et al. ................................. | 395/108 |
| 5,648,801 | 7/1997 | Beardsley et al. ......................... | 347/43 |

*Primary Examiner*—N. Le
*Assistant Examiner*—Lamson D. Nguyen
*Attorney, Agent, or Firm*—William A. Henry, II

[57] ABSTRACT

A color liquid ink printing system, including multiple processors, depositing color liquid ink to form a color image on a recording medium in response to color image data. The printing system includes a processor, receiving the color image data, and outputting a plurality of color image signals, each of the plurality of color image signals representing color information of one of a plurality of color planes. A plurality of graphics processors, coupled to the processor, receive the plurality of color image signals and output a plurality of bitmap image signals in response thereto. A color liquid ink printhead, coupled to the plurality of graphics processors, receive the plurality of bitmap image signals and deposit liquid ink on the recording medium in response thereto.

6 Claims, 6 Drawing Sheets

LIQUID INK PRINTER HAVING MULTIPLE PROCESSORS FOR FAST COLOR IMAGING

CROSS-REFERENCE TO RELATED APPLICATION

Cross-reference is made to patent application Ser. No. 08/883,091 entitled "Data Translating Memory System" being filed concurrently herewith.

FIELD OF THE INVENTION

This invention relates generally to liquid ink printers and more particularly to a liquid ink printer having multiple processors for fast color imaging.

BACKGROUND OF THE INVENTION

Liquid ink printers of the type frequently referred to as continuous stream or as drop-on-demand, such as piezoelectric, acoustic, phase change wax-based or thermal, have at least one printhead having drop ejectors from which droplets of ink are directed towards a recording sheet. Within the printhead, the ink is contained in a plurality of channels. Power pulses cause the droplets of ink to be expelled as required from orifices or nozzles at the end of the channels.

In a thermal ink-jet printer, the power pulses are usually produced by resistors, each located in a respective one of the channels, which are individually addressable to heat and vaporize ink in the channels. As voltage is applied across a selected resistor, a vapor bubble grows in the associated channel and initially the ink bulges from the channel orifice. The bubble quickly collapses and the ink within the channel then retracts and separates from the bulging ink thereby forming a droplet moving in a direction away from the channel orifice and towards the recording medium whereupon hitting the recording medium a dot or spot of ink is deposited. The channel is then refilled by capillary action, which, in turn, draws ink from a supply container of liquid ink. Operation of a thermal ink-jet printer is described in, for example, U.S. Pat. No. 4,849,774.

The ink jet printhead may be incorporated into either a carriage type printer, a partial width array type printer, or a page-width type printer. The carriage type printer typically has one or more relatively small printheads containing the ink channels and nozzles. The printheads can be sealingly attached to one or more disposable ink supply cartridges and the combined printheads and cartridge assembly is attached to a carriage which is reciprocated to print one swath of information (equal to the length of a column of nozzles), at a time, on a stationary recording medium, such as paper or a transparency. After the swath is printed, the paper can be stepped a distance equal to the height of the printed swath or a portion thereof, so that the next printed swath is contiguous or overlapping therewith. This procedure is repeated until the entire page is printed.

In contrast, the page width printer includes a stationary printhead having a length sufficient to print across the width or length of a sheet of recording medium at a time. The recording medium is continually moved past the page width printhead in a direction substantially normal to the printhead length and at a constant or varying speed during the printing process. A page width ink-jet printer is described, for instance, in U.S. Pat. No. 5,192,959.

Printers typically print information received from an image output device such as a personal computer. Typically, these output devices generate pages of information in which each page is in the form of a page description language (PDL). An electronic subsystem (ESS) in the printer transforms the page description language into a raster scan image which is then transmitted to a peripheral or image output terminal (IOT). The raster scan image includes a series of scan lines in which each scan line contains information sufficient to print a single line of information across a page in a linear fashion. In the page description language, printed pages also include information arranged in scan lines.

In known thermal ink jet printheads or printbars which print a single line of pixels in a burst of several banks of nozzles, each bank prints a segment of a line. The banks of nozzles are typically fired sequentially and the nozzles within a bank are fired simultaneously. An ink jet printbar having banks of nozzles is described in U.S. Pat. No. 5,300,968 to Hawkins, incorporated herein by reference. These printbars include a plurality of printhead dies, wherein each die prints a portion of a line. Within the die, the banks of nozzles print a segment of the portion of the line. Many printing devices, including xerographic printers having a laser raster output scanner, use information in raster scan format to print the image without performing manipulation of the image data received. The architecture of liquid ink printheads, however, being dependent on the sequential firing of banks of nozzles and the simultaneously fired nozzles within a bank requires some type of manipulation of the image information. Historically, the necessary data manipulation has been done with software. Software processing performed the manipulation before the data was shipped to the printhead. These processes, however, can be time consuming and not very efficient.

Various printers and methods for manipulating image data for printing on a recording medium are illustrated and described in the following disclosures which may be relevant to certain aspects of the present invention.

U.S. Pat. No. 4,567,570 to Peer describes a logic network and method for processing columns of vertically oriented image data bits to produce control signals for operating a linearly slanted printhead. The network and method includes writing different equal byte segments of each column into a RAM memory while preskewing successive bytes, respectively, from one another by the equivalent of the number of columns of print resolution capability between successive print elements of the printhead represented by each byte.

U.S. Pat. No. 5,016,190 to Thomson describes a method and apparatus for converting data representative of a plurality of cells arranged independently of one another on a page into data in raster scan order for subsequent printing. Cell data for individual cells is fetched in an order dependent on the line of raster scan where the cell first appears in the bit position for the first bit representing the cell.

U.S. Pat. No. 5,579,453 to Lindenfelser describes a smart direct memory access controller for data transformation. The controller is used in computer systems to read and/or write data in a non-linear fashion in order to alter the organization of data stored within the computer system.

U.S. Pat. No. 5,619,622 to Audi et al. describes a full width array raster imaging interface for an ink jet printer. The raster imaging interface transforms raster information for printing by a thermal ink jet full width array printbar.

SUMMARY OF THE INVENTION

In accordance with one aspect of the present invention, there is provided a color liquid ink printing system depositing color liquid ink to form a color image on a recording medium in response to color image data. The printing system includes a processor, receiving the color image data, and outputting a plurality of color image signals, each of the plurality of color image signals representing color information of one of a plurality of color planes, a plurality of graphics processors, coupled to the processor, receiving the plurality of color image signals and outputting a plurality of bitmap image signals in response thereto, and a color liquid ink printhead, coupled to the plurality of graphics processors, receiving the plurality of bitmap image signals and depositing liquid ink on the recording medium in response thereto.

Pursuant to another aspect of the invention, there is provided a method of forming color images with a liquid ink printhead depositing liquid ink on a recording medium in response to color image data. The method includes the steps of generating a plurality of color image signals from the color image data, each of the generated color image signals corresponding to color information of a color image plane, generating a plurality of bitmap image signals by processing each of the plurality of color image signals with a different graphics processor dedicated to processing a different color image plane, and depositing color liquid ink on the recording medium in response to the generated plurality of bitmap image signals to form the color image.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
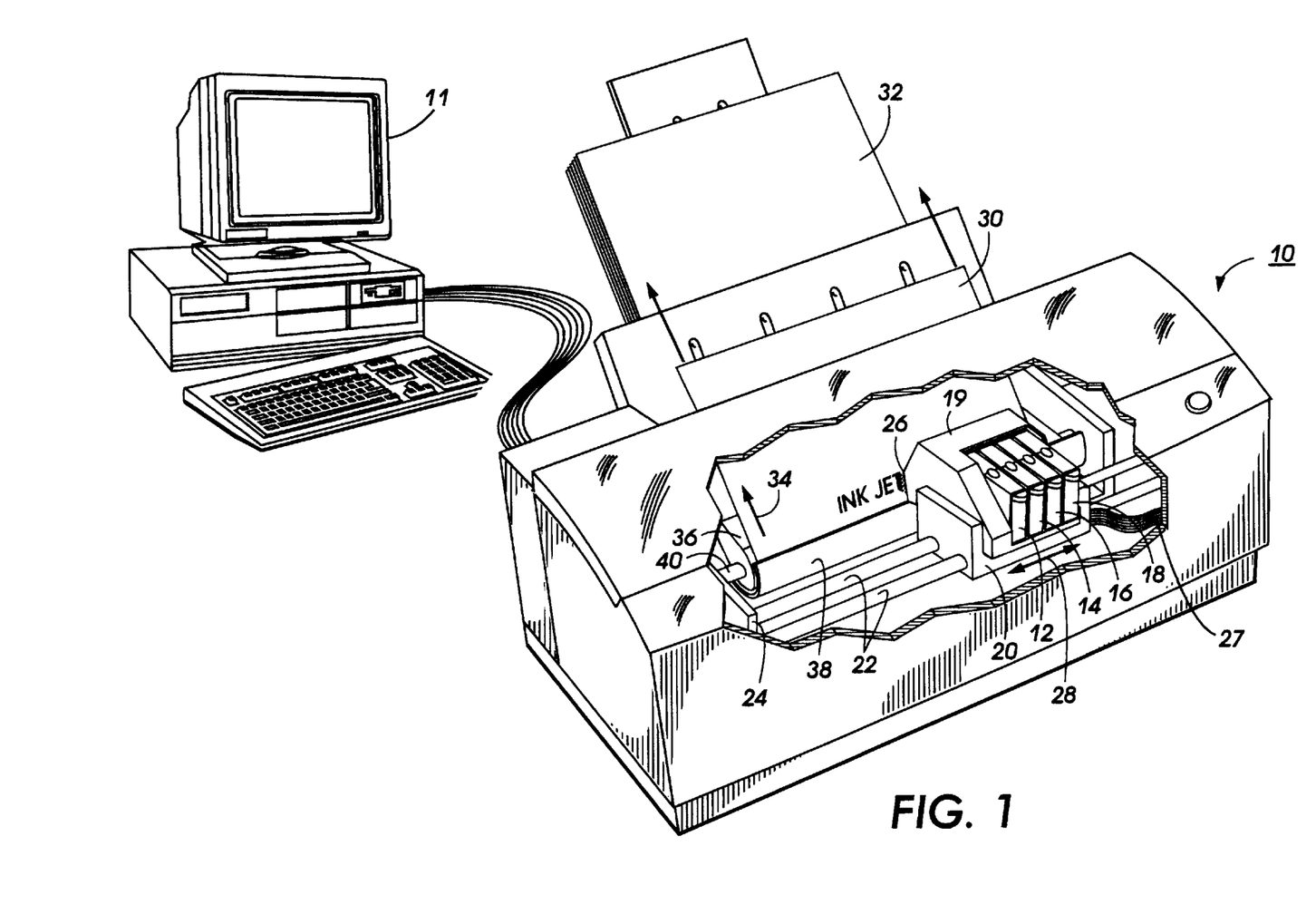
FIG. 1 illustrates a perspective view of a color ink jet printer incorporating the present invention.

FIG. 1 illustrates a perspective view of a color thermal ink jet printer 10 which incorporates a preferred embodiment of the present invention. Printer 10 is exemplary only. The invention can be practiced in other types of liquid ink printers, as well as other image reproduction devices including color printers depositing colorants, including color toners, with a print element in response to signals received from an input device such as a document raster input scanner or a computing device, such as a personal computer 11. Printer 10 includes four ink jet ink containers 12, 14, 16, and 18 mounted in a print cartridge 19 on a carriage 20 supported by carriage rails 22. The carriage rails 22 are supported by a frame 24 of the ink jet printer 10. The printhead cartridge, which comprises the ink containers, contain ink for supply to one or more thermal ink jet printheads 26 which selectively expels droplets of ink under control of electrical signals received from a controller (not shown) of the printer 10 through an electrical cable 27. The printhead 26 contains a plurality of ink channels (not shown) which carry ink from one or more of the ink containers 12, 14, 16, and 18 to respective ink ejecting orifices or nozzles of the printhead 26.

When printing, the carriage 20 reciprocates or scans back and forth along the carriage rails 22 in the direction of an arrow 28. As the printhead 26 reciprocates back and forth across a recording medium 30, fed from an input stack 32 containing, for instance, sheets of paper or transparencies, droplets of ink are expelled from selected ones of the printhead nozzles towards the recording medium 30. The ink ejecting orifices or nozzles are typically arranged in a linear array perpendicular to the scanning direction 28. During each pass of the carriage 20, the recording medium 30 is held in a stationary position. At the end of each pass, the recording medium is stepped in the direction of an arrow 34. For a more detailed explanation of the printhead and printing thereby refer to U.S. Pat. No. 4,571,599 and U.S. Pat. No. Re. 32,572, the relevant portions of which are incorporated herein by reference.

The single recording sheet 30 is fed from the input stack through the printer along a path defined by a curved platen 36 and a guide member 38. The sheet 30 is driven along the path by a transport roller 40 as is understood by those skilled in the art or, for instance, as illustrated in U.S. Pat. No. 5,534,902, herein incorporated by reference. As the recording medium 30 exits the slot between the platen 36 and guide member 38, the sheet 30 is caused to reverse bow such that the sheet is supported by the platen 36 at a flat portion thereof for printing by the printheads 26.

Figure 2:
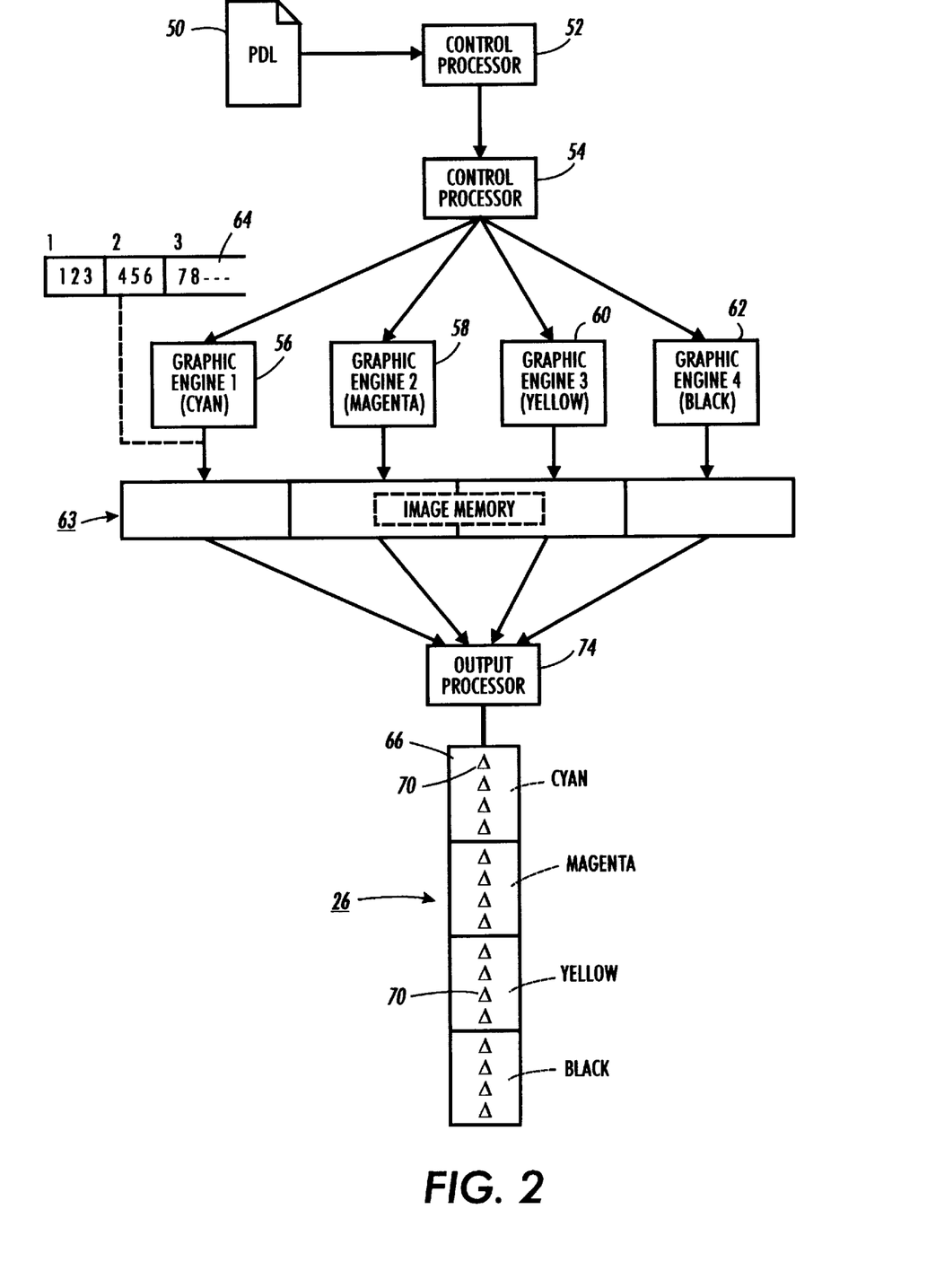
FIG. 2 illustrates a schematic block diagram of the present invention including a multiple processor color imaging system.

FIG. 2 illustrates a schematic block diagram of the present invention including a multiple processor color imaging system. The fast color imaging system uses multiple processors to increase the speed of preparing color images generated by the personal computer 11 and here illustrated as a page description language document 50. By using multiple processors, each processor is specialized for a given task such as performing rasterization and/or providing for recombination of processed images for printing by the printhead 26. By using multiple processors, the time necessary for image preparation normally associated with performing color imaging is reduced. Such printing systems can include more or less processors depending on the desired design of the liquid ink printers where high cost machines could include more processors versus low cost machines having fewer processors.

As illustrated in FIG. 2, seven processors are used to accomplish the fast color imaging of the present invention. Once the personal computer 11 has generated the PDL document 50, the document 50 is sent to a first control processor 52 which accomplishes PDL parsing as is known by those skilled in the art. The control processor 52 receives the input document and translates it into commands for a second control processor 54 which is coupled to a first graphic processor 56, a second graphic processor 58, a third graphic processor 60, and a fourth graphic processor 62. In operation, the first control processor 52 or PDL parser takes the input document 50 and translates the received commands for further operations performed by the second control processor 54. For example, if the PDL document 50 includes a Postscript™ code as follows:

(0.5, 0.1, 0.4, 0.2) setcmykcolor 0 0 move to 100 100 lineto then the control processor 52 translates this command for further operation by the control processor 54. The translation provides for the following command:

drawLine(color=(0.5, 0.1, 0.4, 0.2), start=(0, 0), end (n=100,100)).

After this command has been generated by the control processor 52, it is transmitted to the control processor 54 which then generates four commands, for drawing lines in four color planes, one for each of the graphics processors 56, 58, 60 and 62 as follows:

To Cyan: drawLine(darkness=0.5, start=(0,0), end=(100, 100))

To Magenta: drawLine(darkness=0.1, start=(0,0), end=(100, 100))

To Yellow: drawLine(darkness=0.4, start=(0,0), end=(100, 100))

To Black: drawLine(darkness=0.2, start=(0,0), end=(100, 100))

Since the present invention is directed to color liquid ink printers, the colors of cyan, magenta, yellow and black, are typically employed for generating color images on a document. Other colors, color planes, or combinations thereof are possible. Consequently, each of the graphics processors receives one of the respective four commands for generating image information in each of the four separate color planes. Each graphics processor is dedicated to processing a single color plane and generates information in parallel for transmission to an image memory 63. By generating the information of drawing lines in parallel, a substantial speed increase of approximately four times is achieved.

Each of the graphics processors, which has received color image signals from the control processor 54, outputs a bitmap image signal, organized for instance as signal 64, consisting of a plurality of individual bits, here numbered 1–8, which is further organized into a plurality of 3 bit words 1, 2 and 3. This generated bitmap image signal, however, is not organized compatibly for use by the printhead 26 which includes a linear array 66 of a plurality of nozzles 70. The color linear array 66 is segmented such that four of the plurality of nozzles 70 are used to print cyan, four of the plurality of nozzles 70 are used to print magenta, four of the plurality of nozzles 70 are used to print yellow and four are for printing black. Due to this particular printhead organization, the bitmap image 64 is incorrectly organized for printing by the cyan portion of the printhead array 66. Consequently, the present invention includes the data translating memory system 63 further illustrated in FIG. 3 and FIG. 4.

Figure 3:
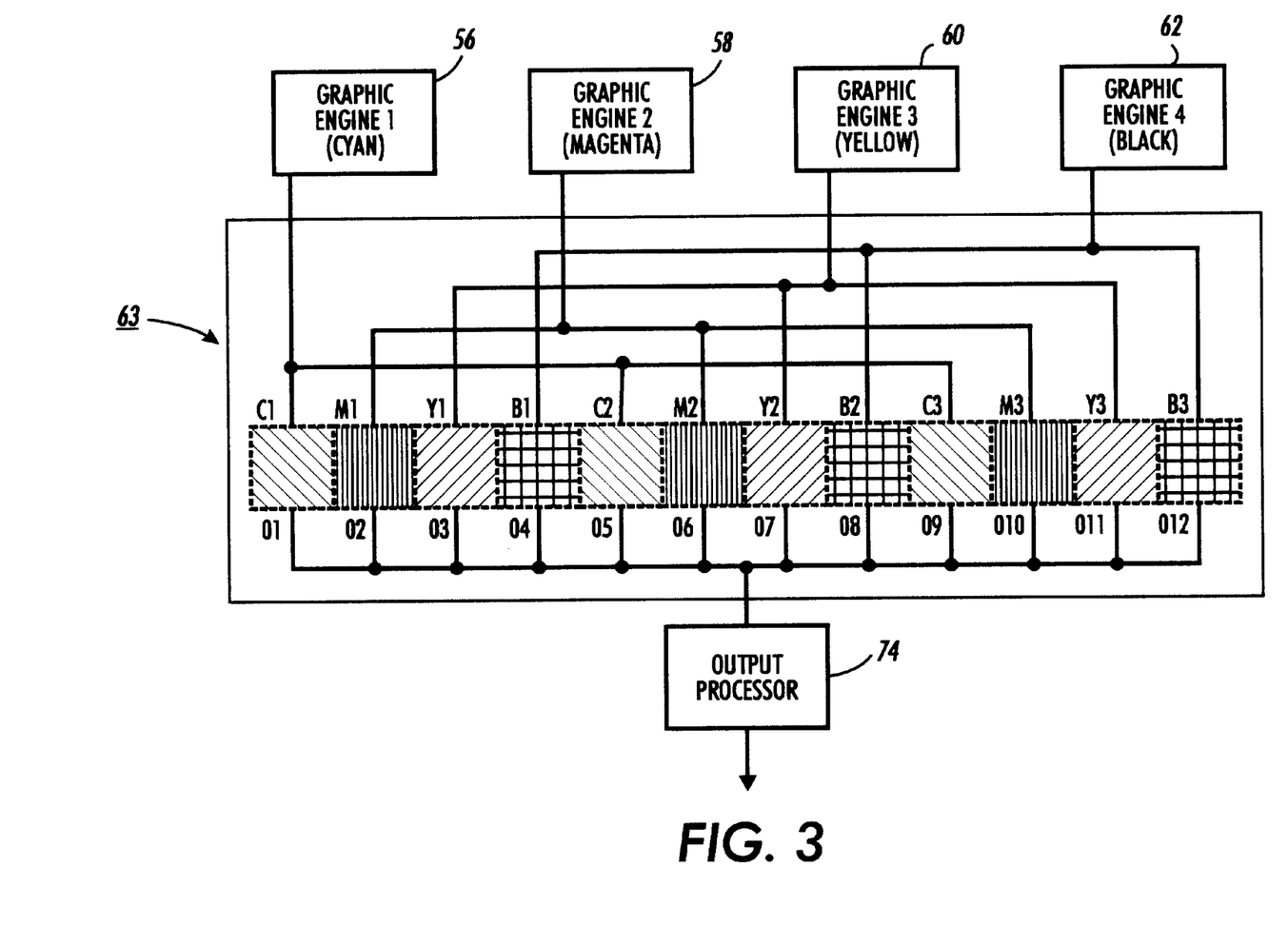
FIG. 3 illustrates a schematic block diagram of a data translating memory system of FIG. 2.

As illustrated in FIG. 3, the memory 63 is organized such that each processor includes its own block of contiguous memory for writing the bitmap image data. The present invention additionally reduces overall image processing time by the specialized memory 63. The memory 63 is organized such that the process of writing the information and the process of reading the information causes the reorganization. Simple read operations, performed by a processor 74, remove the image bitmap data in the proper order for use by the printheads due to the memory structure. Data preparation time necessary to print images is greatly simplified for printers where the data order has to be carefully controlled such as the illustrated array 66 or for partial width or page width printbars.

Figure 4:
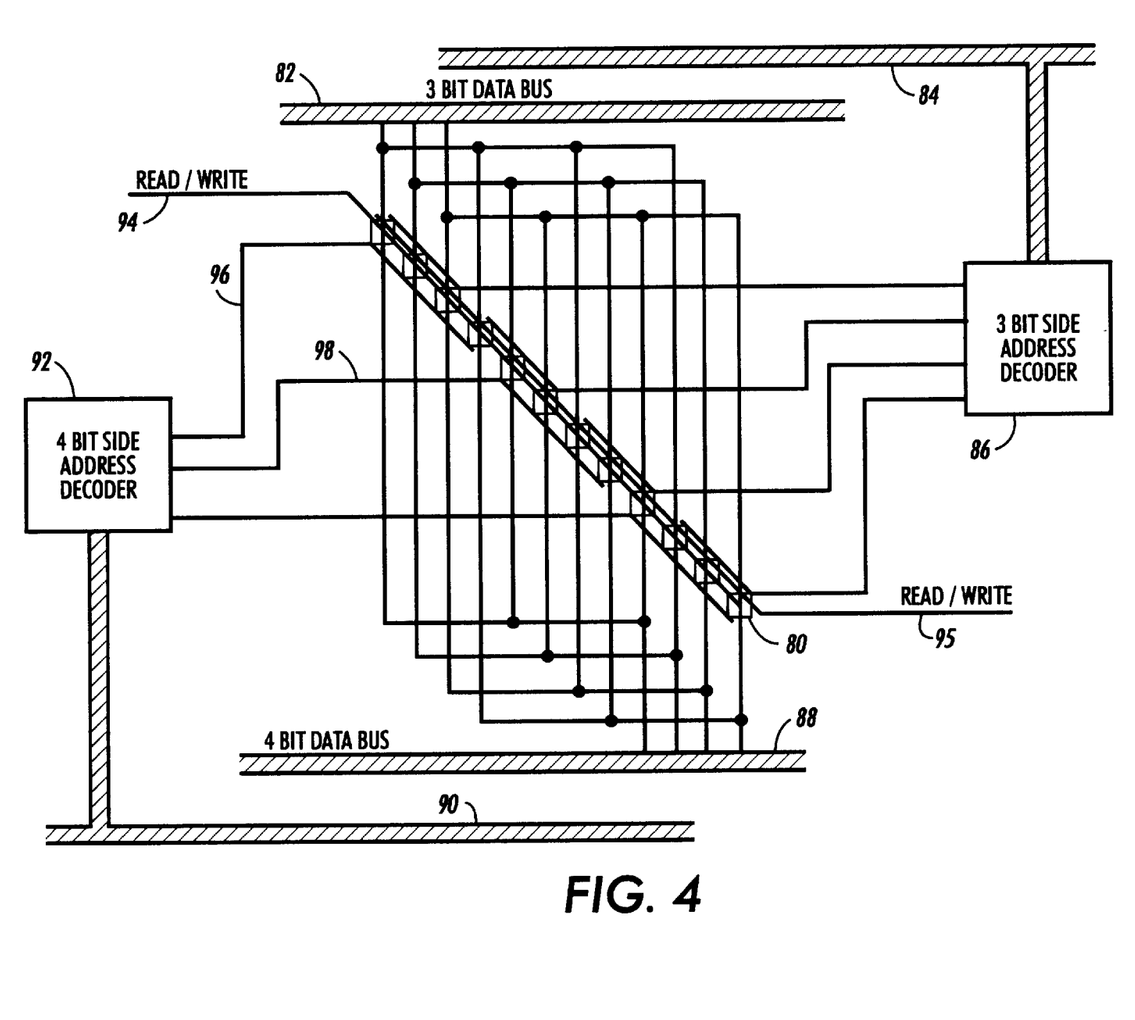
FIG. 4 illustrates a schematic diagram of the data translating memory system of FIG. 3.

FIG. 4 illustrates a combinational logic circuit of the cyan portion of the memory 63 which includes a plurality of memory cells 80, in this example, being equal to twelve. The memory cells are grouped such that a first data bus 82 writes (or reads) three bit data words to four groups of three cells responsive to the information transmitted on an address line 84 which is decoded by a three bit side address decoder 86. In addition, a second data bus 88, here illustrated as a four bit data bus is connected to the memory cells 80 such that a four bit word is written to (or read from) one of three groups consisting of four memory cells per group according to the address selection transmitted over an address selection line 90 which is appropriately decoded by a four bit side address decoder 92 for selecting one of the three groups of four memory cells. In addition, a read/write signal transmitted by a read/write selection line 94 and a read/write selection line 95 determines whether or not information from the appropriate data bus is written into a memory cell or read from a memory cell.

Figure 5:
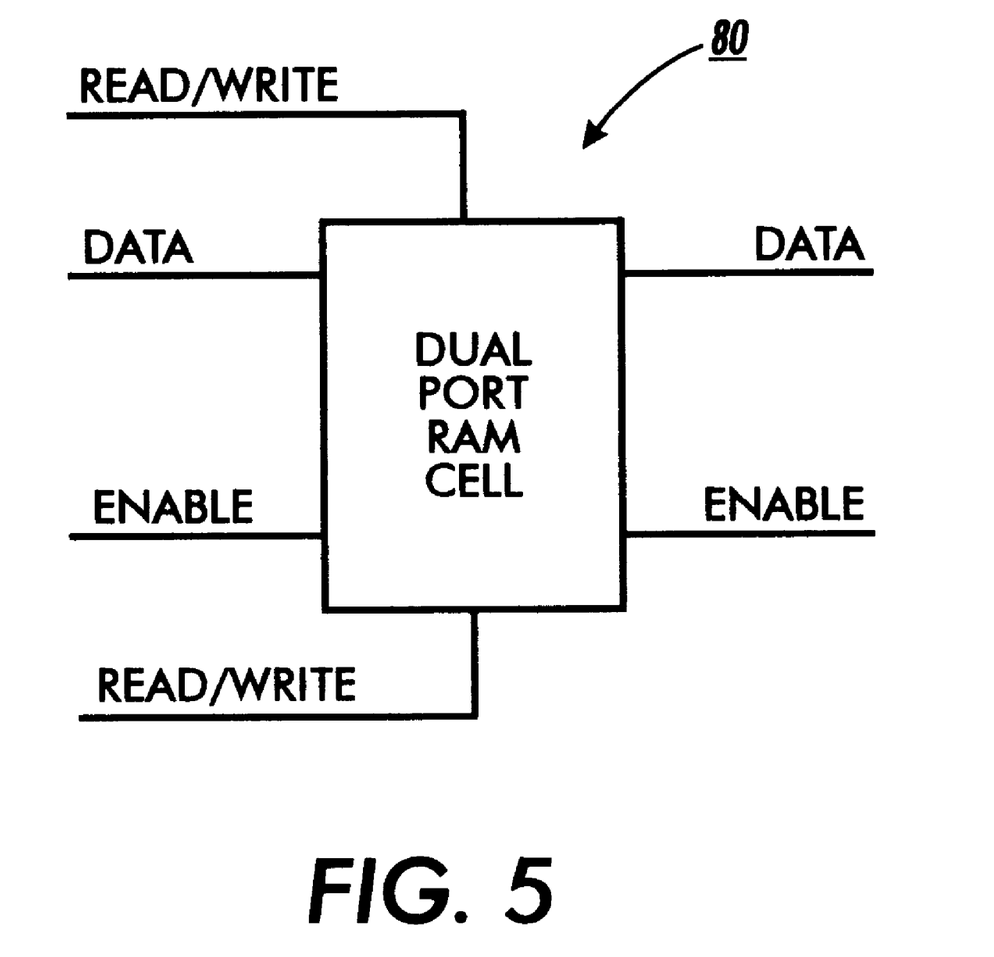
FIG. 5 illustrates one embodiment of a memory cell.

FIG. 5 illustrates one embodiment of the memory cell 80 including a dual port RAM cell, as is understood by those skilled in the art. The memory cell includes a data line, an enable line, and a read/write line for enabling storage and retrieval of a bit of one data word and a data line, an enable line, and a read/write line for enabling storage and retrieval of a bit of the other of the data words.

In a write operation for the three bit organized data word 64, the first word of three bits is written to one of the four groups of three cells over the three bit data bus 82. Since the printhead 66 requires four bits of information when printing with the cyan portion of the array, the four bit data bus reads the necessary four bits by selecting the appropriate group of memory cells, for instance, by line 96 selected by the address decoder 92. When a second vertical column of cyan ink drops is deposited during a swath of the printhead, the four bit side address decoder selects the second group of four memory cells over the line 98 which have been previously written into by two separate three bit words (words 2 and 3 of bitmap 64) each written into different three bit groups of memory cells. The data translating memory system of FIG. 4, therefore, provides for word data of different lengths to be written and read from memory using different addressing schemes enabled by the hardware memory cell structure.

Different word sizes transmitted by including two data address buses coupled to the physical memory. For instance, translating from 16 bit data words to 24 bit data words or converting data from a machine having eight bit data words to a printhead with 11 bit addressed pixels can be accomplished. The example of FIG. 4, using three bit and four bit data words is exemplary only, and any size of data words can be accommodated with a properly structured memory as described herein. Consequently, for any two data words of different lengths a first word having m data bits and a second word having n data bits, the total number of data bits i is equal to the least common multiple of the sizes. For instance, i=LCM(mn). The memory therefor requires at least m×n memory cells for reading words of a different bit length than those written.

The present invention is equally applicable, however, to data words of the same size. In this instance, data transposition/rotation can be accomplished with a rectangular matrix having two m bit word data buses. For instance, instead of writing software code to transpose a bitmapped image from columns to rows, the memory is organized so that the m bit words are written into columns and m bit words are read out from the rows.

Specialized mappings from one data organization to another can also be accomplished by arranging the memory so that the data words are written in a convenient manner for the writer and read in a convenient manner for the reader. For instance, printing with a system composed of several different processors as described herein, all doing common work in unique environments that will eventually be combined such as drawing graphic images in separate planes, can be rapidly accomplished. The memory mapping is generated so that each processor has its own block of contiguous memory for writing the image but the output processor 74 has the data arranged therefore so data can be simply read without additional manipulation of the data. This greatly simplifies the data preparation time needed to print images especially on printers where the data order must be carefully controlled such as in full width array printbars.

By properly designing the data translating memory system, it is possible to rearrange the data without the need for software algorithms but instead by writing to and reading from the memory. To do this most effectively, two data ports with separate addressing mechanisms, as illustrated, should be used. While the applications of such a system, have wide applicability, one advantage, as described herein, is simplifying data stream conversion between the ESS (used for rasterizing the document) and an IOT (used for printing the rasters) and enabling a multiprocessor architecture for color image decomposition.

Once the data has been translated by the memory 63, the output processor 74 accesses the image data in the form of bitmap information in the proper order by simple read operations from the image memory. The output processor 74 then performs additional image manipulation such as undercolor removal. While undercolor removal is known to be performed by software manipulation, the present invention includes in FIG. 6, a hardware undercolor removal circuit 100 illustrated, by example, for a one bit per pixel color plane color image. The circuit 100 includes a black input 102, a yellow input 104, a magenta input 106, and a cyan input 108. The yellow, magenta and cyan signals are ANDed together at an AND gate 110 which, if each of the yellow, magenta and cyan inputs are present, the output of the AND gate will be high. This output is ORed with the black input at an OR gate 112 which has as its output the undercolor removal signal here shown as K' on output line 114. Consequently, if the black input is present or if all three of the yellow, magenta or cyan inputs are present, the output at line 114 will be high. Undercolor removal is achieved and black is printed instead of printing a process black including yellow, magenta and cyan signals.

Figure 6:
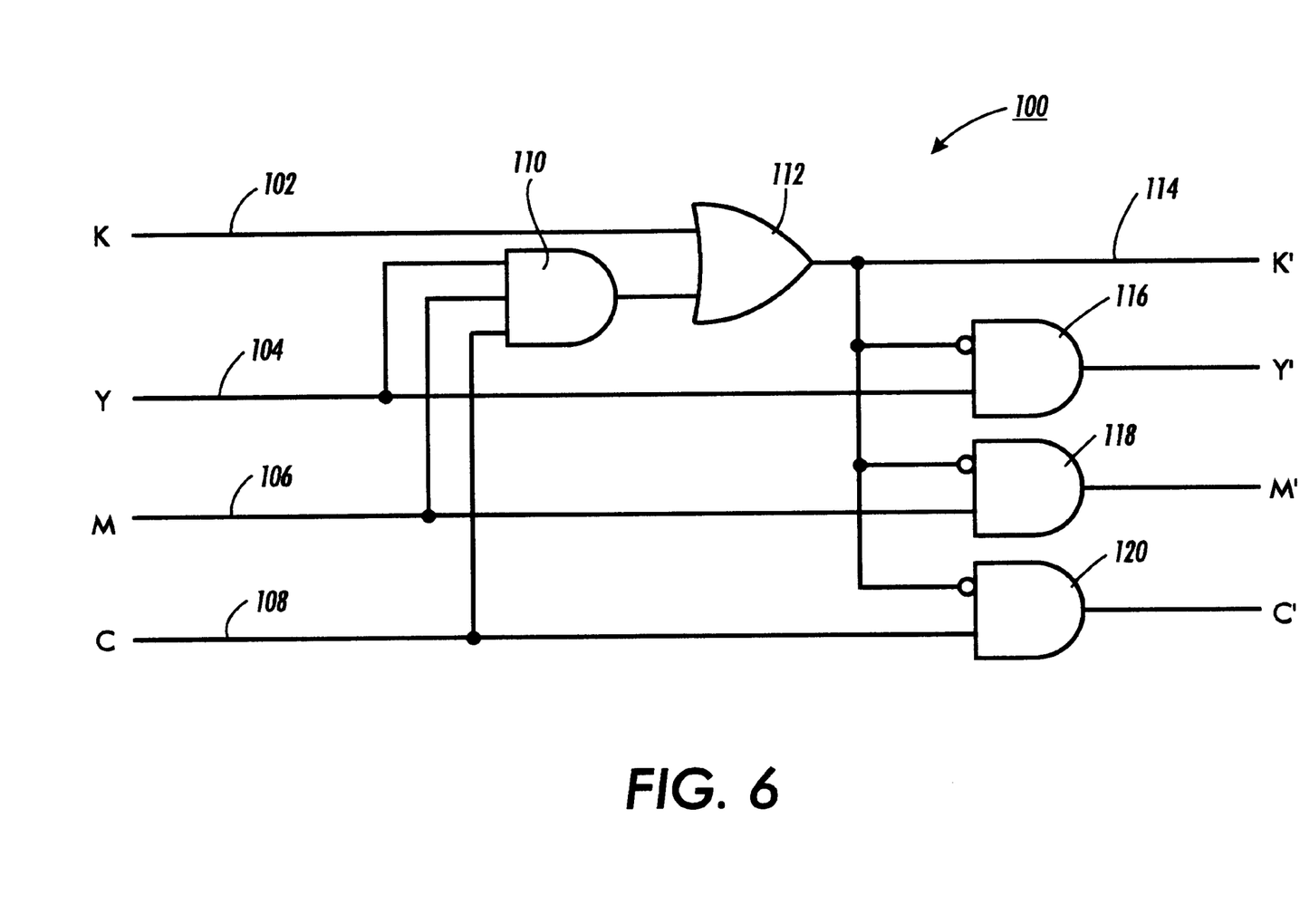
FIG. 6 illustrates a schematic hardware circuit diagram useful for performing undercolor removal.

The circuit 100 further includes a yellow AND gate 116, a magenta AND gate 118, and a cyan AND gate 120. The output of the OR gate 112 is negated at the input of each of the AND gates and the original yellow, magenta and cyan signals, present on the inputs 104, 106 and 108, are input to the respective AND gates as illustrated. Consequently, when the output of the OR gate 112 indicates that black ink is deposited, then the yellow, magenta and cyan outputs of each of the AND gates 116, 118 and 120 are low indicating that none of these colors is printed. By providing a hardware undercolor removal circuit for the output processor 74, image manipulation speed of color information is increased to enable faster printing. In addition to undercolor removal performed by the output processor 74, additional image manipulation functions such as pixel etching and automatic image enhancement can be performed.

In recapitulation, there has been described a liquid ink printer including multiple processors for fast color imaging. In addition, a translating memory system included in the liquid ink printer provides for data storage as well as data manipulation upon reading from the memory. It is, therefore, apparent that there has been provided in accordance with the present invention a color imaging system which enables faster printing of color images received from an image generating device. While this invention has been described in conjunction with a specific embodiment thereof, in an ink jet environment, it is evident that many alternatives, modifications, and variations will be apparent to those skilled in the art. For instance, the present invention including multiple processors for fast color imaging can be used in color xerographic printers having a xerographic print engine or element depositing color toners in response to color image data. In addition, color imaging on a color display device or color monitor is also contemplated. Accordingly, it is intended to embrace all such alternatives, modifications and variations that fall within the spirit and broad scope of the appended claims.

What is claimed is:

1. A fast, color liquid ink imaging system, comprising:

a first processor for receiving an input document and translating it into signal commands;

a second control processor adapted to receive said signal commands from said first processor and split said commands into four color signals;

at least four graphics processors adapted to each receive one of said split signals from said second control processor, and wherein each of said at least four graphics processors generates an image in parallel with each other;

an image memory for receiving signals from said at least four graphics processors;

an output processor adapted to receive a signal from said image memory for transmission to a printhead, said output processor receiving said signal from said image memory as an entire block of memory used by said at least four graphics processors that has already been correctly ordered for output to a printhead; and a color liquid ink printhead, coupled to said output processor for receiving said signal from said output processor and depositing liquid ink on a recording medium in response thereto.

2. The fast, color liquid ink imaging system of claim 1 wherein each of said at least four graphics processors receives one of said split image signals and outputs bitmap image signals in response thereto.

3. The fast, color liquid ink imaging system of claim 2, wherein said first control processor includes a translating processor for receiving color image data and generating a plurality of command signals, each of said plurality of command signals corresponding to one of said four color signals.

4. The fast, color ink imaging system of claim 3, wherein said output processor includes an electronic undercolor removal circuit.

5. The fast, color liquid ink imaging system of claim 4, wherein said received signals from said color graphics processors includes color information of cyan, magenta, and yellow.

6. The fast, color liquid ink imaging system of claim 5, wherein said output processor transmits a single bit signal including color information of black.

* * * * *